UNITED STATES PATENT OFFICE.

ALBERT KÜHLEWEIN, OF BERLIN, GERMANY.

MANUFACTURE OF ASBESTOS CEMENT, &c.

SPECIFICATION forming part of Letters Patent No. 530,645, dated December 11, 1894.

Application filed April 10, 1894. Serial No. 507,059. (No specimens.)

*To all whom it may concern:*

Be it known that I, ALBERT KÜHLEWEIN, a subject of the King of Prussia, residing at Berlin, in the Kingdom of Prussia, German Empire, have invented new and useful Improvements in the Manufacture of Asbestos Cement and of Coverings or Molded Objects Made Therefrom, of which the following is a specification.

This invention relates to a new asbestos cement, forming a fire proof, weather resisting material intended to protect wood and iron structures against the influence of the weather and to render them fire proof to such an extent that they will not be injured by long, intense action of fire. For this purpose asbestos is mixed with a number of pulverulent substances such as gypsum, lime - powder, chalk, powdered fire-clay, graphite, &c., in various proportions, according to whether it is desired to have a specifically light or heavy material.

For the light cement, which is used where under surfaces and lower parts of structures can only be lightly loaded and where it is principally the object to protect them against the influence of the weather, the compound may advantageously consist of the following: thirty to thirty-five parts of pure asbestos, or a mixture of equal parts of pure asbestos and asbestine, sixty to seventy-five parts of gypsum, twenty-five parts of lime powder, twenty parts of chalk, twenty parts of crucible or fire clay powder, thirty parts of graphite, and twenty parts of coke ashes.

For a specifically heavier material, which is employed, when in addition to protection against weather it is desired to protect effectually against fire and the formation of smoke, and where the isolating material has to withstand considerable loads, the following compound is advantageously employed: thirty to thirty-five parts of a mixture of pure asbestos mixed with equal proportions of asbestine, sixty to seventy parts of cement, twenty-five parts of lime powder, twenty-five parts of chalk, twenty parts of crucible or fire clay powder, thirty-five parts of graphite, and twenty-five parts of coke ashes, pumice, or clay powder.

The above mentioned asbestine is a known product belonging to the same class as asbestos and resembling talc in appearance.

The asbestos cement, obtained by the above mentioned mixtures, is applied in layers, varying in thickness (according to the nature of the object to be coated and its destination) upon the surfaces of the wood or iron structures either as ready - formed dry molded pieces, or in the form of mortar.

In either case the coating or covering of asbestos cement has preferably embedded in it a layer of galvanized wire netting.

The dry molded covering pieces are produced by mixing the pulverulent mixture with water to form a thick paste or mortar, which is then molded to form slabs, plates, arch stones, or other covering pieces.

The galvanized netting, above mentioned, is embedded about centrally with respect to the thickness of the piece and materially increases its strength.

The molded pieces are dried in the air and can, when dry, be fixed in position by nails, screws, &c., on iron or wood structures so as to form coverings for walls, floors, columns, doors, girders, &c.

An advantage of these dry molded pieces of asbestos cement is that they can be built up dry in existing dried buildings or structures, so that such buildings or structures can be at once used.

If the asbestos cement is to be applied in a plastic condition to structures of any kind, this is effected simply by first fixing in the position, which the coating or covering is to occupy, a stretched wire netting, which in the case of a covering to a wall or other object, should be at a distance therefrom of about one-half the thickness of the isolating covering, to which netting is then applied the asbestos cement in the same way as ordinary plastering so as to coat the netting on both sides to the required thickness, in the middle of which coating the wire netting will then be embedded. After superficial drying the wall, &c., is smoothed down, and after complete hardening it can be painted, papered, &c.

To further increase the strength of thick slabs, plates, &c., I use in addition to the wire netting, nettings of jute fiber which are embedded in the cement. In this case, in the manufacture of dry molded slabs, there is for example stretched on either side of the wire netting a sheet of the jute netting at a certain distance from the former, so that the wire netting is situated between two jute nettings, or, in case of thicker slabs, there may be two or more jute nettings on either side and the asbestos cement mortar is then introduced into the mold so as to penetrate all the layers.

When applying the cement as mortar or plaster directly to the walls, &c., there is first applied on both sides of the wire netting a layer of asbestos cement, and over this is stretched the jute netting, and upon this is again spread a layer of asbestos cement, and so on. In most cases a single jute netting on each side of the wire netting will suffice.

The use of this asbestos cement will allow of the most rapid construction of entire buildings which can be readily taken down again, of separate parts of buildings, as walls, ceilings, roofs, wood or iron coverings, &c., which shall be perfectly proof against every kind of atmospheric influences, and which may be attacked by fire, but cannot be destroyed thereby and which also prevents the formation of smoke and effectually prevents the extension of fire.

The application of the molded pieces of asbestos cement, as also of the mortar therefrom is in no way confined to buildings. The material is suitable in the same way for the manufacture of fire proof heating flues, for forming channels, for coating boilers, &c., to prevent radiation of heat, as also in the manufacture of safes, bank vaults and the like.

While, in general, I prefer to use a mixture of equal parts of pure asbestos and asbestine as a component part of the cement,—the asbestine may be omitted.

What I claim as new is—

1. A fire and weather proof asbestos cement composed of asbestos, gypsum, lime-powder, chalk, fire-clay, and graphite, substantially as described.

2. A fire and weather proof asbestos cement composed of asbestos, asbestine, gypsum, lime powder, chalk, fire clay, graphite and coke ashes, substantially in the proportions set forth.

3. A slab or other covering composed of asbestos, gypsum, lime powder, chalk, fire clay, graphite, and coke ashes with an embedded wire netting and a textile netting embedded on opposite sides of the wire netting, substantially as described.

In testimony whereof I have signed my name to this specification in the presence of two subscribing witnesses.

ALBERT KÜHLEWEIN.

Witnesses:
LUDWIG GLASER,
GUSTAV HÜLSMANN.